Patented June 11, 1929.                                    1,717,248

UNITED STATES PATENT OFFICE.

UGO PESTALOZZA, OF MILAN, ITALY, ASSIGNOR TO SOCIETA ITALIANA PIRELLI, OF MILAN, ITALY.

MANUFACTURE OF RUBBER ARTICLES. REISSUED

No Drawing. Application filed July 8, 1927, Serial No. 204,421, and in Italy January 31, 1927.

The present invention relates to certain new and useful improvements in the treatment of rubber latex in its natural or concentrated condition, with the object of causing its thickening and coagulation under given physical conditions so as to enable the rapid and sure manufacture of a great variety of rubber articles.

It is a well known fact that natural or preserved rubber latex, both diluted and concentrated, behaves in different manners when treated with different chemical substances, organic or inorganic: some of which do not alter appreciably the physical features of the latex; others on the contrary, either immediately or after a certain time, give rise to the coagulation of the particles of rubber in suspension in the latex.

Naturally among the latter chemical substances are chosen those which are used or have been proposed for coagulating the rubber from the latex.

In order to obtain said coagulation, it is however necessary that the concentration of the coagulating substance in relation to the latex be maintained above a certain minimum value. If lower concentrations are used it is possible, by adding to the latex substances apt to preserve it, to prevent the latex, when left to itself, from being subjected to alterations: the latex can simply thicken without coagulating even with a prolonged storage in a suitable place and under suitable conditions.

Hereafter is described, by way of illustration, the behaviour of salts of bi- and trivalent metals, because lately the use of the same has been suggested repeatedly both as coagulating and as thickening agents for the latex, with the object either of coagulating the rubber from the latex by adding to its said salts, diluted or in suspension in water, or else of converting the latex into a mass flowing less readily and consequently better suited for the purpose in view. It is a known fact that such compounds, whether dissolved or simply held in suspension in water, when added to the latex can produce coagulation, or, when added in less quantity, can thicken the same in proportion to the concentration of the compound with regard to the latex.

But such salts, like many other materials, have another action upon the latex which was altogether ignored heretofore and which forms the chief feature of the present invention.

If said salts are added to the latex in very small proportions, for instance in the ratio of about 3 grams of calcium sulphate dissolved or held in suspension in water for 1000 grams of dry residuum of latex and the treatment is carried on at a temperature lower than about 20° C., it does not cause coagulation, the thickening is slight and the latex may be preserved unaltered at said temperature or at a lower temperature for an indefinite time.

If on the contrary the latex so treated be warmed to a temperature above the limit now stated, but below the boiling temperature of the latex, the thickening increases with the temperature and with the time this temperature is applied, up to complete coagulation.

Naturally the higher the temperature, the greater will be the thickening and the quicker will be the coagulation. Coagulation is very rapid at temperatures above 75-80° C. and almost instantaneous at such temperatures when the latex is slightly shaken.

The coagulum obtained when the mass is not shaken, can have a very slight consistency, appearing as a suspension of very minute particles in the aqueous phase or can be compact and resisting notwithstanding its enclosing all the serum.

The one or the other case may occur according to the compound or compounds added (it is obvious that mixtures of salts of bi- or trivalent metals can be used) or the same or of any one of them can be added to the rubber latex together or separately, with gasoline or other chemical bodies whose presence can have the object of promoting or controlling the thickening process or the coagulation.

The addition of such bodies can be easily obtained when the same are dissolved or held in suspension in water or in any other solvent, chosen according to the special properties of said bodies. It is advisable that the solvent contain one of the chemicals usually employed for preserving the latex, for instance ammonia.

The latex ought also to contain a preserving agent; it can have its original rubber content or be concentrated: it can contain in solution or in suspension vulcanizing agents, colouring matter or fillers, as, for applying the process here described, it is sufficient that it be stable in the conditions under which the above stated substances are added, and that between these substances and any others that may have been previously added to the latex, no chemical reaction should take place that may cause an untimely coagulation.

Confining the example to the description of the behaviour of salts of bi- or trivalent metals, it may here be stated that quantities not greater than 1.5 grams of a soluble or slightly soluble salt of calcium and 1 gram of zinc-oxide, in suspension in a few cubic centimeters of ammonia added, stirring all the time, to 1000 grams of latex preserved in ammonia and containing 50% of rubber, or else quantities not greater than 1.5 grams of calcium salt by suspension in a few cubic centimeters of ammonia water added while stirring, to 1100 grams of latex having 50% of rubber preserved in ammonia, and containing 100 grams of benzole or of gasoline, cause a light thickening, when the addition of said chemicals and the preserving of the latex are carried out at a temperature lower than 20° C., but are sufficient to cause a very rapid thickening and coagulation when the latex is brought for a sufficient time to a higher temperature, under 100° C., a few minutes being sufficient, for instance, to obtain coagulation at about 95-97° C.

There are many organic or inorganic bodies which have a similar behaviour.

While I have here described the behaviour of a given class of bodies, such description is by no means to be understood as indicating that the same procedure cannot be extended to all bodies, of however different chemical constitution, the object of said description being purely to examine the action of the bodies mentioned on the latex with regard to their thickening and coagulating properties.

Having thus described the preliminary treatment which the latex has to undergo, a few illustrations will now be given, describing some processes of manufacturing rubber articles, and some possible applications due to the special features and properties acquired by the latex.

Some of the articles (for instance teats, bulbs for dropper tubes, surgical gloves, etc.) have heretofore been manufactured by using pure rubber solutions or rubber-scrap solutions in gasoline. Suitable moulds are dipped in these solutions and after having been taken out, the solvent is allowed to evaporate from the solution adhering to the mould; the latter remains covered by a slight layer of rubber. The operation is repeated several times until the desired thickness is obtained, the articles being then finished, vulcanized and stripped from the mould.

It is evident that the expense from gasoline loss, which is large, even if special apparatus for recovering the solvent be used, combined with the time required by this process make it a rather costly proposition.

It has been proposed to use, instead of gasoline or benzole solutions, diluted or concentrated rubber latex, following the same process, but notwithstanding its advantages such a method has the drawback of requiring a great length of time for drying the layers of rubber.

Moulds of porous material have also been suggested, which, by partially absorbing the latex serum, allow a thicker layer of rubber to deposit at each dip; but even this process, besides being suitable only for manufacturing thin rubber articles, has many drawbacks which make it rather difficult to apply.

The process hereafter described solves the problem entirely and by using it the manufacture of rubber articles on forms or in moulds is rendered so quick and cheap, that it can be extended to many other articles made at present in other ways.

A suitable form or mould or core or a certain number of the same is hung from a convenient support in such a way as to be uniformly warmed: for instance if the moulds are hollow, by circulating hot water in them. Said moulds are dipped in a trough containing natural or concentrated latex, with or without vulcanizing agents, colouring matter or fillers, prepared as described above and preserved at such a low temperature as to prevent coagulation. After warming the moulds as above stated at a proper temperature and keeping them in the bath for a convenient length of time, they are taken out covered with a layer of thickened latex adhering to them, which layer rapidly coagulates and, after having been dried, becomes a rubber layer whose thickness depends on the temperature of the mould and on the length of time of the dip.

If for instance water at 95° C. is used to warm the mould or core, layers of dry rubber some millimeters thick can be obtained with a dip lasting not more than 5 minutes.

Once the layer of thickened latex is coagulated, if desired or if necessary for further operations, the moulds or cores can be dipped in lukewarm or cold water, with the object of washing away from the coagulated rubber all soluble matter: the articles thus formed on the moulds or cores can be thoroughly or only partially dried, and once finished can be stripped or not from the moulds and subsequently vulcanized according to the latex composition.

The surface of the articles thus manufactured is smooth and the thickness more uniform than those obtained from gasoline solutions of rubber.

This process of local coagulation through local warming of the wall on which or near which the layer of rubber has to be deposited, is entirely new and forms the chief object of the present invention.

The manufacture of inner tubes for tires, tubing, etc. can be carried out in this way; and in such case a core is used whose outer diameter is equal to the inside diameter of the tube to be obtained and which can anyhow be conveniently warmed. It can be dipped in the latex, warmed and taken out after the layer of coagulum has formed on it, or else, after having been brought to a proper temperature, it can be shifted along in the bath of latex with a continuous motion. The tube so formed can then be treated as above described.

If the article to be manufactured cannot be formed on a core or mandrel, the process can be modified as follows: The mould whose inside surface has the form and dimensions of the article to be obtained, is made of several built-up pieces so as to form a cavity with an opening, which cavity is filled with latex having undergone the treatment described above, and the mould is then uniformly warmed from the outside to the required temperature and for the time required to obtain the thickness of rubber wanted.

The fluid latex is then poured out and air, possibly warm, is blown into the cavity of the mould, which latter after a certain time can be allowed to collapse leaving the article ready for further treatment.

By the same process it is possible to manufacture rubber sheets by bringing in contact, by any appropriate means, a warmed surface with the latex prepared as above described, and if the surface be a cylinder partially dipped in the latex for its whole length and revolving continuously, the layer of coagulated rubber can be detached as soon as it comes out of the latex, thus obtaining a continuous strip of rubber whose thickness depends on the temperature of the surface of the cylinder and on its speed.

If a fabric or a set of threads, yarns, cords or ribbons, be made to move along the warmed metallic surface in the latex, at a proper speed, a very simple and convenient method of waterproofing or rubberizing fabrics can be developed.

Another interesting application of the properties gained by the latex after the above described treatment, is the manufacture of articles such as threads, cords, small tubes, etc. heretofore prepared by other long and costly methods.

It has already been proposed to manufacture these articles from rubber latex, natural or concentrated, by letting it flow into a medium having a high coagulating action. The very rapid coagulation of the stream of latex flowing out of a nozzle should allow it to retain the form and dimensions which the latter has at the exit.

Evidently this could only be obtained with articles of a small section and size, as coagulation can take place with the necessary speed only on the superficial layers of the thread so that this method has not found any practical application.

The process here proposed obtains this object in a much better and more practical way.

A trough of latex prepared as above is connected to small pipes or nozzles whose inside section has the form and size of the article wanted.

The pipe can be warmed by suitable means to a convenient temperature towards the nozzle end: the latex is forced into the pipes by exerting, for instance, a pressure on the liquid surface of the bath.

The latex, in passing through the warmed parts of the pipe, coagulates, maintaining the form and internal size of the nozzle, and is extruded continuously by the same pressure that forces it into the pipes and being sufficiently consistent, can be collected for further treatment.

If in the inside of each pipe be placed another closed pipe fixed to it in such a way as to leave an annular section at the nozzle, the coagulum will be expelled in tubular form.

Hereabove have been described, as examples, a few ways of manufacturing various articles which illustrate some applications of the properties of the latex after the treatment described: obviously any other process which, by means of any mechanical device or physical apparatus, can be used to manufacture rubber articles or to rubberize fabrics, or which can be used for any particular object in the treatment of rubber, following the treatment described above, after which the latex is conveniently prepared so as to coagulate or simply thicken the parts of the latex which are directly or indirectly warmed as above clearly disclosed, is to be considered within the limits of the present invention.

What I claim is:

1. A process of manufacturing rubber articles from latex, comprising the steps of adding to the latex such an amount of coagulating agent as will coagulate the latex solely at a temperature between 70°–100° C.; bringing the latex into contact with a mould; heating the latex through the mould to said temperature to effect coagulation; and drying the coagulated latex.

2. A process of manufacturing rubber articles from latex, comprising the steps of adding to the latex such an amount of coagulating agent as will coagulate the latex solely at a temperature between 70°–100° C.; bringing the latex into contact with a mould; and heating the latex through the mould to said temperature to effect coagulation.

3. A process of manufacturing rubber articles from latex, comprising the steps of adding to latex which has previously been subjected to a preserving treatment with ammonia such an amount of coagulating agent as will coagulate the latex solely at a temperature between 70°–100° C.; bringing the latex into contact with a mould; and heating the latex through the mould to said temperature to effect coagulation.

4. A process of manufacturing rubber articles from latex, comprising the steps of adding to the latex such an amount of a soluble metal salt as will coagulate the latex solely at a temperature between 70°–100° C.; bringing the latex into contact with a mould; and heating the latex through the mould to said temperature to effect coagulation.

5. A process of manufacturing rubber articles from latex, comprising the steps of adding to latex which has previously been subjected to a preserving treatment with ammonia such an amount of a soluble metal salt as will coagulate the latex solely at a temperature between 70°–100° C.; bringing the latex into contact with a mould; and heating the latex through the mould to said temperature to effect coagulation.

6. A process of manufacturing rubber articles from latex, comprising the steps of adding to the latex such an amount of coagulating agent as will coagulate the latex solely at a temperature between 70°–100° C.; bringing the latex into contact with a mould; and heating the latex carried by the mould to said temperature for a period sufficiently long to obtain a coagulated layer of the desired thickness.

7. A process of manufacturing rubber articles from latex, comprising the steps of adding to the latex such an amount of coagulating agent as will coagulate the latex solely at a temperature between 70°–100° C.; bringing the latex into contact with a mould; and heating the latex carried by the mould through the latter to said temperature to effect coagulation.

8. A process of manufacturing rubber articles from latex, comprising the steps of adding to the latex such an amount of coagulating agent as will coagulate the latex solely at a temperature between 70°–100° C.; bringing the latex into contact with a mould; and heating the latex carried by the mould through the latter to said temperature for a period sufficiently long to obtain a coagulated layer of the desired thickness.

9. A process of manufacturing rubber articles from latex, comprising the steps of adding to the latex such an amount of a soluble metal salt as will coagulate the latex solely at a temperature between 70°–100° C.; bringing the latex into contact with a mould; and heating the latex carried by the mould to said temperature for a period sufficiently long to obtain a coagulated layer of the desired thickness.

10. A process of manufacturing rubber articles from latex, comprising the steps of adding to the latex such an amount of a soluble metal salt as will coagulate the latex solely at a temperature between 70°–100° C.; bringing the latex into contact with a mould; and heating the latex carried by the mould through the latter to said temperature for a period sufficiently long to obtain a coagulated layer of the desired thickness.

In testimony whereof I affix my signature.

UGO PESTALOZZA.